Aug. 29, 1961 R. J. TRAISE 2,997,998
SPEAR GUN ATTACHMENT
Filed Jan. 27, 1959
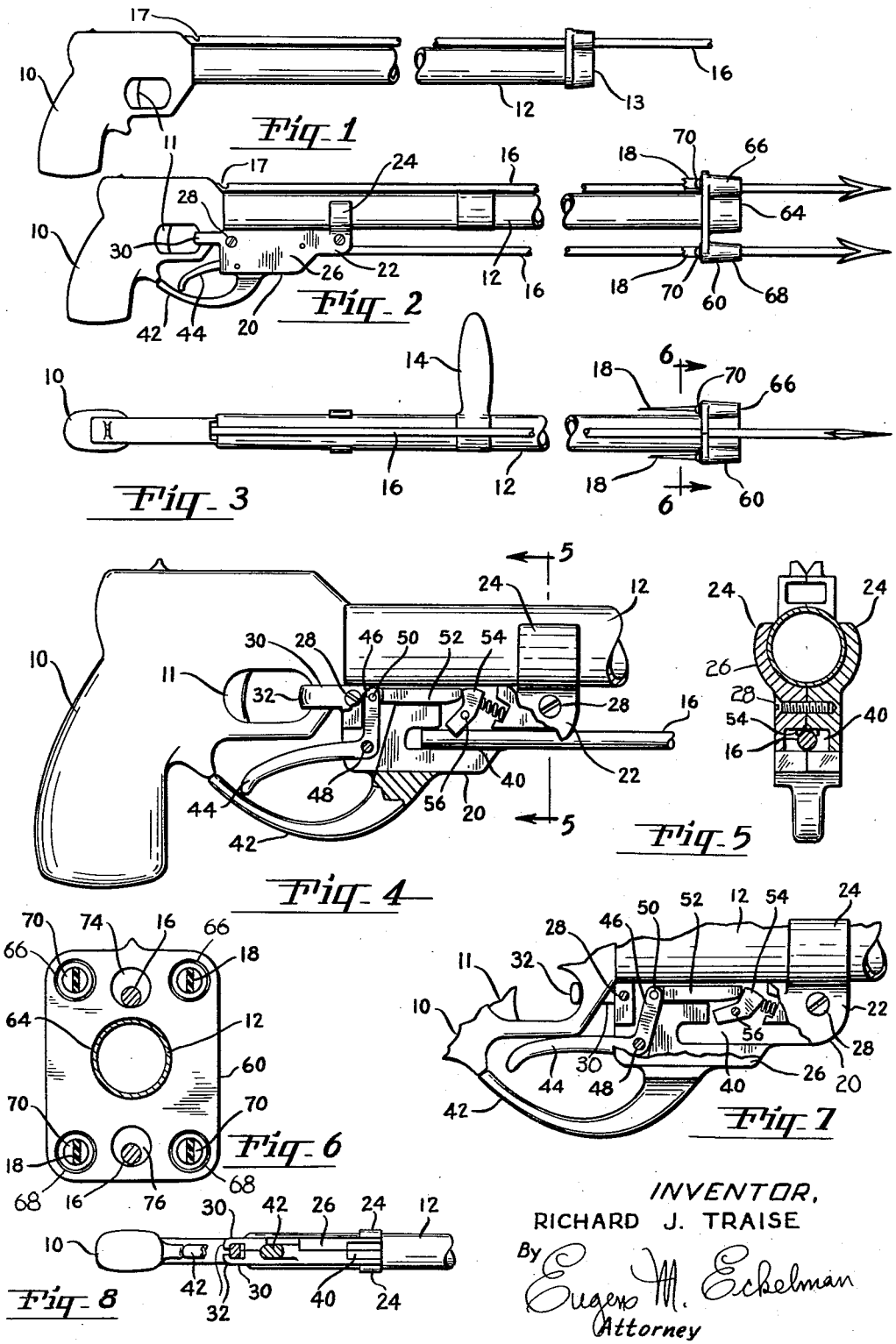
INVENTOR,
RICHARD J. TRAISE
By Eugene M. Eckelman
Attorney United States Patent Office 2,997,998
Patented Aug. 29, 1961

2,997,998
SPEAR GUN ATTACHMENT
Richard J. Traise, Rte. 3, Box 96, Molallo, Oreg.
Filed Jan. 27, 1959, Ser. No. 789,321
1 Claim. (Cl. 124—22)

This invention relates to spear guns and is more particularly concerned with an attachment for a spear gun to increase the utility thereof.

A disadvantage of present popular spear guns resides in the fact that such guns are capable of projecting only a single spear. After the single spear has been propelled, immediate need often arises for the use of a second spear, but inasmuch as the single spear must be retracted, if possible, and the gun re-cocked the need for such second spear often disappears. Therefore, it is a primary object of the present invention to provide an attachment for a spear gun which makes available a second spear which may be fired either simultaneously or independently of a first spear.

Another object is to provide an attachment for a spear gun which is readily mounted on the gun without altering said gun.

A further object is to provide an attachment of the type described which is simple in structure and which does not appreciably add to the bulk of the spear gun.

Still another object is to provide an attachment of the type described having a positive acting trigger mechanism separate from the trigger which controls the first spear.

Generally stated, the invention comprises a body member having clamp means thereon for mounting the attachment on a conventional spear gun. The body member has means for receiving the butt end of a spear and trigger means for holding such spear in cocked position. The trigger means is adapted to release the spear which is then projected by means of tension elements comprising stretchable elastic tendons. Also comprising a part of the present invention is a head member adapted to be attached to the end of the barrel of the spear gun. This head comprises an attaching point for the elastic tendons and has a double aperture for guidably receiving the spears in upper and lower positions.

The invention will be better understood with reference to the description in the following specification of a preferred form thereof. Various changes may be made in the construction and arrangement of parts without departing from the spirit of the invention.

In the drawings:

FIGURE 1 is a side elevational view of a conventional spear gun to which the present invention may be applied;

FIGURE 2 is a side elevational view of the spear gun of FIGURE 1 with the present attachment applied thereto;

FIGURE 3 is a top plan view of the spear gun of FIGURE 2;

FIGURE 4 is a side elevational view of the grip end of the spear gun with portions of the attachment being broken away;

FIGURE 5 is a sectional view taken on the line 5—5 of FIGURE 4;

FIGURE 6 is a sectional view taken on the line 6—6 of FIGURE 3 showing head structure for the end of the barrel;

FIGURE 7 is a fragmentary elevational view similar to FIGURE 4 but showing the trigger mechanism in released condition; and FIGURE 8 is a bottom plan view of the grip end of the gun.

Referring now to the drawings there is shown in FIGURE 1 a spear gun of conventional type to which the present attachment may be applied. Such a spear gun comprises a pistol grip 10, having the usual trigger mechanism 11, a barrel 12, a head 13 on the outer end of the barrel 12, and a laterally extending hand grip 14, FIGURE 3, intermediate the ends of the barrel. This gun is adapted to propel a spear 16 having a notch 17 on its butt end engageable by tension elements 18, FIGURE 3, anchored on the head 13.

The present invention comprises a body member 20 capable of being attached to the lower portion of the spear gun at the grip end of said gun. For this purpose body member 20 has a forwardly extending portion 22 terminating in a pair of upwardly directed, arcuate fingers 24 adapted to grip more than half the circumferential area of the barrel 12 to form a positive grip thereon. Body member 20 has a removable side plate 26 which carries one of the gripping fingers 24. This plate is attached to the body by screws 28.

Body member 20 also has rearwardly projecting fingers 30 one of which is on plate 26. Fingers 30 have right angle tabs 32 which grip the trigger guard of the spear gun from opposite sides. Therefore, by means of the fingers 24 and 30, the present attachment may be detachably secured to the spear gun.

Body member 20 has an aperture 40 extending inwardly from its front edge for receiving the rear end of a spear. Projecting rearwardly from the body member 20 is a trigger guard 42 which confines a trigger 44 having an integral, upwardly extending portion 46. The trigger is pivotally mounted on the body member by means of a pin 48 and is pivotally connected at its upper end by a pin 50 to one end of a forwardly projecting link 52 mounted in the body 20 for slidable movement. It is apparent that by movement of the trigger 44 in a clockwise direction the link 52 will slide forwardly.

Link 52 is adapted to engage a catch member 54 pivoted to the body member 20 on a pin 56. This catch member is adapted to project into the upper portion of the spear receiving aperture 40 and is urged in a counter-clockwise direction by a spring 58. In the rest position of the parts, the lower end of the catch projects into the aperture 40, as seen in FIGURE 4. Thereupon, with the spear placed in the aperture 40 the catch 54 engages the notch 17 in the spear whereupon the elastic tendons may be stretched rearwardly and the gun cocked. The released position of the trigger mechanism is shown in FIGURE 7 wherein the operator has pivoted the finger portion 44 sufficiently to slide the link 52 forwardly and rotate the catch 54 out of engagement with the spear, whereupon the elastic tendons propel the spear away from the gun.

Forming a part of the present invention is a head member 60 which replaces head 13 shown in FIGURE 1. As seen in FIGURE 6, head 60 has a central apertured portion 64 for receiving the end of the barrel 12. Head 60 may be held on the barrel by a tight frictional fit between these two parts or by other suitable means such as by set screws. Head 60 has a pair of upper socket portions 66 and a pair of lower socket portions 68 each of which is adapted to receive plugs 70 on terminal ends of the elastic tendons 18. The plugs 70 are preferably mounted in the sockets 66 and 68 by a screw threaded arrangement between the two and therefore are removable and replaceable in the event an elastic tendon should break.

The head 60 has upper and lower apertures 74 and 76, respectively, for slidably receiving the upper and lower spears.

In operation, it will be evident that the present attachment provides a second spear for a spear gun and that whereupon if it is desired to propel more than one spear, the second spear is available, or if desired it is possible to release both spears at the same time by pulling both triggers simultaneously. It is also evident that the attachment by its means of gripping the gun forms substantially an integral part thereof and yet is removable by simply pulling off the head 60 and by removing the screws 28. The present attachment also does not add appreciably to the bulk of the gun.

Having now described my invention and in what manner the same may be used, what I claim as new and desire to protect by Letters Patent is:

A spear gun comprising a handle portion and a barrel portion, first spear holding means on its upper side for supporting a spear on said upper side, first trigger means engageable with the spear for holding and releasing the spear, a trigger guard on said handle portion, second spear holding means on the lower side of the gun for supporting a spear on said lower side, finger grip means on said second spear holding means releasably gripping said trigger guard and said barrel portion for mounting said second holding means on said lower side of the gun, second trigger means mounted on said second spear holding means and being engageable with the spear on the lower side of the gun for holding and releasing the spear, and a head on the end of the barrel portion, said head having upper and lower apertures for slidably receiving the upper and lower spears.

References Cited in the file of this patent

UNITED STATES PATENTS

| | | |
|---|---|---|
| 2,496,217 | Kearny | Jan. 31, 1950 |
| 2,760,480 | Carroll | Aug. 28, 1956 |
| 2,869,273 | Thorburn | Jan. 20, 1959 |

FOREIGN PATENTS

| | | |
|---|---|---|
| 1,008,427 | France | May 19, 1952 |
| 1,016,161 | Germany | Sept. 19, 1957 |